Patented Feb. 13, 1940

2,190,461

UNITED STATES PATENT OFFICE 2,190,461

LACQUER MANUFACTURE

Max Raymond Vogel, Easton, Pa., assignor to Binney & Smith Co., New York, N. Y., a corporation of New Jersey No Drawing. Application July 28, 1937,
Serial No. 156,107

15 Claims. (Cl. 134—79)

This invention relates to lacquers and the like containing solid pigmenting material of colloidal fineness, such as carbon black. More particularly this invention relates to a black lacquer or like material wherein the dispersion of carbon black in the vehicle is more uniform and more permanent than previously obtainable under conditions hereinafter described. The invention also includes the method whereby such an improved product is prepared.

A lacquer consists essentially of a vehicle or body material such as cellulose ester or a mixture of cellulose esters and resins dissolved in a suitable solvent such as ethyl, butyl, or amyl acetate or mixtures of such solvents. In making a black lacquer it is customary to incorporate a black pigment such as carbon black in the above specified ingredients. A plasticizer such as dibutyl phthalate or tricresyl phosphate is frequently desirable in such mixtures.

Desirable properties of black lacquers are (1) maximum blackness, (2) maximum gloss, (3) permanence of color and (4) maximum covering power. Particularly desirable is a black lacquer which has a definitely black tone which contains no trace of the brownish cast often observed in such lacquers. To obtain a permanent and maximum blackness it is essential that an extremely finely divided black pigment be thoroughly and permanently dispersed through the lacquer. Carbon black is such a finely divided black pigment which when used in the proper manner and with the proper ingredients produces an excellent black lacquer which has these desired properties.

By thoroughly milling the lacquer ingredients together with the carbon black in the presence of a dispersing agent such as copper salts or copper soaps of fatty acids, maximum dispersion of the pigment with resulting high covering power and distinctly black cast of the resulting lacquer has been obtained. Such a process for preparing a permanent black lacquer, and the product itself is described in U. S. Patent 1,987,980, granted January 15, 1935, on an application of Carl W. Sweitzer.

According to the process described in the Sweitzer patent, the ingredients of the lacquer together with a sufficient amount of volatile solvent to maintain a soft and plastic mass are thoroughly mixed at a suitable temperature by a milling operation until the volatile solvent has evaporated and the mixture becomes dry and brittle. This product is at this point in the form of a thin, brittle sheet which is then broken into chips. These chips are prepared for use by dissolving them in a suitable solvent, or are marketed as such in which case they are dissolved in the solvent by the purchaser.

In preparing the lacquer for application, the dry chips are dissolved in a solvent which may vary considerably in composition. A typical solvent which is suitable for this purpose is described in the Sweitzer patent and consists primarily of toluene, with lesser amounts of ethyl and butyl acetates together with a small proportion of butyl alcohol. Ethyl alcohol is sometimes added as a component of such a solvent mixture. A plasticizer is sometimes added at this point depending on the characteristics of the lacquer film desired.

In the preparation of the lacquer for application, a further addition is frequently made in the form of certain suitable gums or resins. Such substances are added for several reasons among which are the improvement of the adhesion and rubbing properties of the resulting lacquer film, and also for economic considerations. These gums and resins when employed may be added to the lacquer in the form of alcoholic solutions, particularly ethyl alcohol. My invention is directed in part to improvements in such lacquers.

In the environment of the solutions of gums and resins, or in cases where ethyl alcohol alone has been added, the previously thoroughly dispersed carbon black particles have a tendency to flocculate. At times this tendency is so great that the dispersion is flocculated sufficiently to be observable on the surface of the liquid mixture. Even though it occurs to only a slight degree, however, this flocculation detrimentally affects the blackness of the final lacquer film, and in extreme cases results in a dull-grayish, or dirty brown tone or cast. This is in contrast to the jet black glossy surface obtained when the carbon black particles remain properly dispersed. Not only does this undesirable flocculation of the carbon black particles occur in the environment of gum or resin solutions, or of alcoholic solutions, but I have also observed similar phenomena where the lacquer chips being dissolved contained unusually large proportions of carbon black pigment. In the production of jet black lacquers containing carbon black and copper soaps, any such flocculation with its deleterious effect on the resulting lacquer film constitutes a serious disadvantage, and the present invention is directed to the elimination of this difficulty.

I have discovered that the above described flocculation of the carbon black which has been dispersed in the lacquer base by means of a copper salt or copper soap of a fatty acid under the described conditions may be prevented by the further addition of relatively small amounts of certain carbon black dispersion-stabilizing polyamines. The term polyamine as used herein embraces amines containing two or more amino groups.

In the practice of my invention, the suitable polyamine may be added to the lacquer mixture during the milling operation when the carbon black is dispersed in the lacquer base, or it may be added to the lacquer solvent prior to or at the same time that the lacquer chips are dissolved therein. Another advantageous method of operation in cases where a copper soap is to be employed as the dispersing agent, is to first thoroughly mix the copper soap and the polyamine and then add this mixture to the other lacquer ingredients at the beginning of the milling operation. In cases where the polyamine is added at the time the lacquer is prepared for use it is essential that the order of mixing be such that the polyamine be present before any substantial flocculation of the carbon black has occurred.

In order for the polyamines hereinafter more specifically identified to operate successfully as dispersion-stabilizers which prevent flocculation of the carbon black, already in a state of high dispersion due to the admixed copper soap, it is essential that the amine be thoroughly and intimately mixed with the lacquer ingredients. If the amine is to be added to the lacquer during the milling process as described above I prefer to use the two stage process of mixing described in U. S. Patent 2,045,006 granted June 23, 1936 on an application of William B. Wiegand. It is to be understood, however, that my invention is not limited to a particular method of dispersing the pigment and amine in the vehicle to form the lacquer.

The polyamines which function successfully to prevent flocculation of carbon black dispersed by means of copper soaps, when in the presence of gums and resins or ethyl alcohol solutions, comprise a wide group of polyamines. Generally speaking, the polyamines which are successful in my process are primary aromatic polyamines. The ultimate test of the effectiveness of any given amine in preventing flocculation under the conditions described is of course an examination of the final lacquer film. Even a relatively small amount of flocculation is detectable in the lacquer film after application and drying on the desired object. In cases of extreme flocculation the film is rough and uneven, whereas in cases of limited flocculation the usual jet black glossy finish is diminished, and the lacquer film assumes a dull cast varying from gray to brown.

I have found that a simple and effective test to determine whether or not any given amine is suitable for use in my improved process may be conducted. By this test which is more fully described below, one can readily determine the extent of flocculation while the lacquer is in a liquid state, thus eliminating the necessity of applying the lacquer and allowing it to dry in order to determine the properties of the resulting lacquer film. The procedure which I recommend in practicing the present invention is to select a convenient primary aromatic polyamine and subject it to the preferred test in the presence of a mixture of lacquer ingredients which has ben shown to flocculate in a "blank" test. If the test indicates that substantially no flocculation has occurred, the lacquer film resulting from a lacquer mixture, having incorporated therein the amine being tested, will possess the desired improved properties. One method of conducting such a test involves dissolving the amine in an organic solvent, dissolving the lacquer chips and adding an alcohol containing solution of a gum. Simultaneously a blank test solution is made up which is identical in every respect except that the amine stabilizing agent is omitted. Each of these two solutions is thoroughly mixed and then either allowed to stand over a period of hours or moderately centrifuged. A comparison of the solutions with respect to transparency or opacity will then indicate whether or not the amine used has exerted any stabilizing effect. In the absence of any such stabilizing effect, the flocculated solution will be observed to have largely or completely settled to the bottom of the tube.

I have found that in general the amines which operate successfully in my process are to be found in the broad class of stable primary aromatic polyamines. The following compounds are recited in order to indicate the broad variation in the various subclasses of the types of primary aromatic polyamines which have been found to be satisfactory for use in my improved lacquer compositions: benzidine, phenylenediamine (meta and para), meta toluylenediamine, polyamino condensation derivatives of sulfanilic acid, and dye intermediates of the following types—rosaniline base, Bismarck brown, induline base and chrysoidine base. It sometimes occurs that a polyamine which is not a primary amine or which frequently is not described as an aromatic amine will operate successfully to prevent flocculation and will give positive results in the described test. An example of such a compound is piperazine (diethylene diamine) which is a cyclic secondary diamine. In the present application I include such a six membered ring compound within the scope of the term "aromatic polyamine." I have found that amines which do not maintain the dispersion of carbon black in the above described test are of no value as dispersion-stabilizers in producing lacquer films according to the present process, and that the lacquer films in which they are incorporated process the same undesirable features that the same mixture of ingredients would have produced had the amine not been present. Generally speaking secondary or tertiary polyamines, monoamines, and aliphatic polyamines are of this class. For example, such compounds as diethylenetriamine, hexamethylenetetramine, diphenylamine, aniline, toluidine, phenylhydrazine, triethanolamine, phenyl naphthylamine, urea, and various substituted guanidines, are not suitable for use in my process.

The quantity of amine necessary to prevent flocculation of the lacquer is relatively small. When employed as a stabilizing agent in lacquers containing copper soaps the amine is advantageously added in quantities ranging from 15% to 80% by weight of the copper soap present. The most commonly used quantity falls within the range 25–55% by weight of the soap. The specific amount of any particular amine to be added to produce optimum results will vary somewhat and the most advantageous amount is determined by experiment. For example, in the case of benzidine and copper oleate, approximately 50% of benzidine based on the weight of copper oleate present produces optimum stabilizing results. Quantities between approximately 50% and 80% of benzidine have no detrimental effects, but result in no advances in stabilizing efficiency over approximately 50%. In certain cases quantities of amine somewhat higher than 80% by weight of the copper soap may be employed without detrimental effects, but in general quantities substantially higher than 80% produce unsatisfactory results and are therefore undesirable. One reason for this appears to be the effect of increased alkalinity involved. It is therefore to be understood that while I have recommended 80% as the desirable upper limit for the quantity of dispersion-stabilizing amine to be used, my invention includes the use of quantities somewhat above this limit providing such amounts give satisfactory results in the above referred to test.

The following two examples will serve to illustrate typical lacquer compositions on which the use of the amines here described have a marked stabilizing effect when alcohol containing solutions of gums are incorporated therein. In these two examples the same lacquer components are employed in varying proportions to produce lacquers of varying properties.

|  | Example I | Example II |
|---|---|---|
| Vehicle—½ sec. nitrocellulose wet with 25% by weight ethyl alcohol | Grams 650 | Grams 650 |
| Pigment—carbon black | 100 | 250 |
| Plasticizer—dibutylphthalate | 150 | 150 |
| Solvent—ethyl acetate | 30 | 30 |
| Dispersing agent—copper oleate | 10 | 20 |

In the mixture represented by Example I, 5 g. benzidine serves as a successful dispersion-stabilizing agent, where as in Example II, this quantity would be increased to approximately 10 g. benzidine.

As stated above the amines which have been found to be successful stabilizing agents according to the present invention are those which prevent flocculation of the lacquer during the period of its preparation, application or drying. Such amines invariably give positive results when subjected to the above referred to test. In this test, lacquer "chips" are prepared according to the method disclosed in the already referred to Sweitzer and Wiegand patents. A typical composition of these chips such as for example that contained in Example I, after being subjected to the two stage milling process of Wiegand is allowed to dry in the open air for 18 hours. The resulting thin and brittle sheet from these particular quantities of ingredients was found to weigh 777 g., indicating that the copper oleate content was 1.3% of the total. The lacquer chips having been prepared, the first step in the preparation of the test solution is to dissolve the amine stabilizing agent in a suitable solvent. The amount of amine added will depend both on the amine and the percentage of copper soap in the lacquer chips. When this has been put in solution, the particular alcohol containing solution of gum which it is desired to use in the lacquer is added to the solvent in which the amine has already been dissolved. A typical solvent which has been found to give satisfactory results is one composed of 50% toluol, 25% butyl acetate, 15% ethyl acetate, and 10% butyl alcohol. In many of the tests which I have conducted to determine the stabilizing effect of various amines, I have employed an alcohol containing solution of gum damar (50% solids) as a flocculating agent, since I have found that this agent is especially detrimental to ordinary lacquer solutions and produces marked flocculation therein. The following example will serve to illustrate a specific procedure for determining the stabilizing effect of an amine in a lacquer of the class described. 10 c. c. of gum damar solution are added to 80 c. c. of the described solvent which contains .032 g. benzidine. To this solution is then added 5 g. of the lacquer "chips" referred to. This mixture is agitated for a period of approximately 48 hours in order to secure thorough mixing. Four drops of this solution are then added to 30 c. c. of the above referred to mixed toluol solvent in a 50 c. c. centrifuge tube, and agitated until the contents are uniform. Concurrently with this procedure a "blank" solution is made up in another centrifuge tube which is identical except for the omission of the amine dispersion-stabilizing agent. The two tubes are then centrifuged for a short period or allowed to stand a minimum of 24 hours. The blank will be completely flocculated and as a rule the flocculated pigment will have settled to the bottom of the tube leaving a clear supernatant liquid. If the tested amine is a successful stabilizing agent, very little if any pigment will have settled. The liquid in the tube will be partially transparent, but colored a black or deep brown due to the completely dispersed unflocculated carbon black particles. The comparative results obtained by this test are normally conclusive when the tubes are subjected to ordinary inspection in a good light. If, however, it is desired to compare in a very precise and quantitative manner any very small degree of difference of flocculation caused by using various amines which may have occurred in suspensions which appear complete to normal observation, this may be done by subjecting the dispersions to a microscopic examination or by examining the solutions in the tubes by means of binoculars.

The above described test is one by which one can determine readily and unmistakably whether or not any given amine is a successful dispersion-stabilizing agent for carbon black pigment when in the presence of alcoholic gums or other substances which produce flocculation in the absence of such an amine. Amines which give positive results in this test, when incorporated in lacquer compositions, invariably result in a lacquer film which has the glossy jet black properties desired whereas the same lacquer composition without the amine produces a lacquer film which has a dull brownish color due to flocculation of the carbon black particles. It is to be understood that mixtures of amines, each of which satisfies the above test, may be employed as well as individual compounds.

I have employed the phrase "dispersion-stabilizers" and "dispersion-stabilizing polyamines" herein and in the claims to designate those polyamines which successfully meet the above described test and which produce an improved lacquer film of the desired properties. It should be understood that the polyamines herein specifically recited as suitable and such other polyamines which, when in solution in an organic solvent of the general type described and in which solution a carbon black lacquer composition is then suspended, have the capacity of preventing flocculation of the carbon black particles, and in whose absence flocculation will occur, are included within the meaning of the phrase "dispersion-stabilizing polyamine."

I have further found that in some instances where for various reasons an excessive proportion of carbon black pigment dispersed by means of a copper soap is employed, there is a tendency for flocculation to occur even in the absence of alcohols or gums. In such cases the above described flocculation test may be employed successfully to determine the stabilizing properties of any given amine. The only variation involved in conducting the test is that no alcohol containing gum solution is added to the test mixture. In the same way as previously recited, any polyamine which successfully meets this test will in turn prevent flocculation in the lacquer and so permit the formation of a lacquer film of the desired properties. Such polyamines also are included in my designation "dispersion-stabilizing amines."

I claim:

1. The method of stabilizing a black lacquer against flocculation, said lacquer including a nitrocellulose containing body, having dissolved therein a copper soap, and having suspended therein a quantity of carbon black in a condition of colloidal dispersion, which comprises incorporating in the lacquer prior to the inception of flocculation, a polyamine selected from the class consisting of benzidine, meta-phenylenediamine, para-phenylenediamine, meta-toluylenediamine, piperazine, an induline base, a rosaniline base, a chrysoidine base, Bismarck brown, and polyamino condensation derivatives of sulfanilic acid.

2. The method of stabilizing a black lacquer against flocculation, said lacquer including a nitrocellulose containing body, having dissolved therein a copper soap, having suspended therein a quantity of carbon black in a condition of colloidal dispersion, and having further incorporated therein a gum which tends to promote flocculation, which comprises incorporating in the lacquer prior to the inception of flocculation, a polyamine selected from the class consisting of benzidine, meta-phenylenediamine, para-phenylenediamine, meta-toluylenediamine, piperazine, an induline base, a rosaniline base, a chrysoidine base, Bismarck brown, and polyamino condensation derivatives of sulfanilic acid in quantity equivalent to from 15% to about 80% by weight of the copper soap present in the lacquer composition.

3. The method of stabilizing a black lacquer against flocculation, said lacquer including a nitrocellulose containing body, having dissolved therein copper oleate, having suspended therein a quantity of carbon black in a condition of colloidal dispersion, and having further incorporated therein an alcohol containing solution of a gum which tends to promote flocculation, which comprises incorporating in the lacquer prior to the inception of flocculation, a polyamine selected from the class consisting of benzidine, meta-phenylenediamine, para-phenylenediamine, meta-toluylenediamine, piperazine, an induline base, a rosaniline base, a chrysoidine base, Bismarck brown, and polyamino condensation derivatives of sulfanilic acid in quantity equivalent to from 15% to about 80% by weight of the copper oleate present in the lacquer composition.

4. The method of stabilizing a black lacquer against flocculation, said lacquer including a nitrocellulose containing body, having dissolved therein copper oleate, having suspended therein a quantity of carbon black in a condition of colloidal dispersion, and having further incorporated therein an alcohol containing solution of a gum which tends to promote flocculation, which comprises incorporating benzidine in the lacquer composition prior to the inception of flocculation, in quantity equivalent to 15-80% by weight of the copper oleate present in the lacquer composition.

5. The method of stabilizing a black lacquer against flocculation, said lacquer including a nitrocellulose containing body, having dissolved therein copper oleate, having suspended therein a quantity of carbon black in a condition of colloidal dispersion, and having further incorporated therein an alcohol containing solution of a gum which tends to promote flocculation, which comprises incorporating meta-phenylenediamine in the lacquer composition prior to the inception of flocculation, in quantity equivalent to 15-80% by weight of the copper oleate present in the lacquer composition.

6. The method of stabilizing a black lacquer against flocculation, said lacquer including a nitrocellulose containing body, having dissolved therein copper oleate, having suspended therein a quantity of carbon black in a condition of colloidal dispersion, and having further incorporated therein an alcohol containing solution of a gum which tends to promote flocculation, which comprises incorporating an induline base in the lacquer composition prior to the inception of flocculation, in quantity equivalent to from 15% to about 80% by weight of the copper oleate present in the lacquer composition.

7. The method of stabilizing a dry lacquer stock adapted to be brought to condition for use by solution, said lacquer stock including a nitrocellulose containing body, having dissolved therein a copper soap, and having suspended therein a quantity of carbon black in a condition of colloidal dispersion, which comprises incorporating in the lacquer stock a polyamine selected from the class consisting of benzidine, meta-phenylenediamine, para-phenylenediamine, meta-toluylenediamine, piperazine, an induline base, a rosaniline base, a chrysoidine base, Bismarck brown, and polyamino condensation derivatives of sulfanilic acid.

8. The method of stabilizing a dry lacquer stock adapted to be brought to condition for use by solution, said lacquer stock including a nitrocellulose containing body, having dissolved therein a copper soap and a gum which tends to promote flocculation, and having suspended therein carbon black in a condition of colloidal dispersion, and which further includes a polyamine selected from the class consisting of benzidine, meta-phenylenediamine, para-phenylenediamine, meta-toluylenediamine, piperazine, an induline base, a rosaniline base, a chrysoidine base, Bismarck brown, and polyamino condensation derivatives of sulfanilic acid in quantity equivalent to from 15% to about 80% by weight of the copper soap present in the lacquer composition.

9. A stabilized non-flocculating lacquer which includes a nitrocellulose containing body, a copper soap dissolved therein, and a quantity of carbon black in a condition of colloidal dispersion therein, and which further includes a polyamine selected from the class consisting of benzidine, meta-phenylenediamine, para-phenylenediamine, meta-toluylenediamine, piperazine, an induline base, a rosaniline base, a chrysoidine base, Bismarck brown, and polyamino condensation derivatives of sulfanilic acid intimately admixed therein.

10. A stabilized non-flocculating dry lacquer stock adapted to be brought to condition for use by solution, said lacquer stock including a nitrocellulose containing body having dissolved therein a copper soap, and having suspended therein carbon black in a condition of colloidal dispersion, and which further includes a polyamine selected from the class consisting of benzidine, meta-phenylenediamine, para-phenylenediamine, meta-toluylenediamine, piperazine, an induline base, a rosaniline base, a chrysoidine base, Bismarck brown, and polyamino condensation derivatives of sulfanilic acid intimately admixed therein.

11. A stabilized non-flocculating lacquer which includes a nitrocellulose containing body, a copper soap dissolved therein, a quantity of carbon black in a condition of colloidal dispersion therein, and an alcohol containing solution of a gum which tends to promote flocculation of the carbon black particles, and which further includes a polyamine selected from the class consisting of benzidine, meta-phenylenediamine, para-phenylenediamine, meta-toluylenediamine, piperazine, an induline base, a rosaniline base, a chrysoidine base, Bismarck brown, and polyamino condensation derivatives of sulfanilic acid intimately admixed therein in quantity equivalent to from 15% to about 80% by weight of the copper soap present.

12. A stabilized non-flocculating dry lacquer stock adapted to be brought to condition for use by solution, said lacquer stock including a nitrocellulose containing body having dissolved therein a copper soap and a gum which tends to promote flocculation, and having suspended therein carbon black in a condition of colloidal dispersion, and which further includes a polyamine selected from the class consisting of benzidine, meta-phenylenediamine, para-phenylenediamine, meta-toluylenediamine, piperazine, an induline base, a rosaniline base, a chrysoidine base, Bismarck brown, and polyamino condensation derivatives of sulfanilic acid intimately admixed therein in quantity equivalent to from 15% to about 80% by weight of the copper soap present.

13. A stabilized non-flocculating lacquer which includes a nitrocellulose containing body, copper oleate dissolved therein, a quantity of carbon black in a condition of colloidal dispersion therein, an alcohol containing solution of a gum which tends to promote flocculation, and benzidine in quantity equivalent to 15-80% by weight of the copper oleate present.

14. A stabilized non-flocculating lacquer which includes a nitrocellulose containing body, copper oleate dissolved therein, a quantity of carbon black in a condition of colloidal dispersion therein, an alcohol containing solution of a gum which tends to promote flocculation, and meta-phenylenediamine in quantity equivalent to 15-80% by weight of the copper oleate present.

15. A stabilized non-flocculating lacquer which includes a nitrocellulose containing body, copper oleate dissolved therein, a quantity of carbon black in a condition of colloidal dispersion therein, an alcohol containing solution of a gum which tends to promote flocculation, and an induline base in quantity equivalent to from 15% to 80% by weight of the copper oleate present.

MAX RAYMOND VOGEL.